United States Patent
Peng et al.

(10) Patent No.: US 12,244,474 B2
(45) Date of Patent: Mar. 4, 2025

(54) ROUTING METHOD, ROUTING DEVICE AND COMPUTER-READABLE STORAGE MEDIUM

(71) Applicant: ZTE CORPORATION, Shenzhen (CN)

(72) Inventors: Shaofu Peng, Shenzhen (CN); Detao Zhao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 17/758,517

(22) PCT Filed: Dec. 17, 2020

(86) PCT No.: PCT/CN2020/137252
§ 371 (c)(1),
(2) Date: Jul. 8, 2022

(87) PCT Pub. No.: WO2021/164402
PCT Pub. Date: Aug. 26, 2021

(65) Prior Publication Data
US 2023/0033298 A1  Feb. 2, 2023

(30) Foreign Application Priority Data
Feb. 19, 2020 (CN) .......................... 202010102220.0

(51) Int. Cl.
*H04L 45/302* (2022.01)
*H04L 41/0894* (2022.01)
(Continued)

(52) U.S. Cl.
CPC ...... *H04L 41/5022* (2013.01); *H04L 41/0894* (2022.05); *H04L 45/126* (2013.01);
(Continued)

(58) Field of Classification Search
CPC . H04L 45/302; H04L 45/126; H04L 41/0894; H04L 45/12; H04L 41/5022; H04L 45/32; H04L 12/725; H04L 29/06
(Continued)

(56) References Cited

U.S. PATENT DOCUMENTS 10,567,293 B1* 2/2020 Pularikkal ............... H04L 69/22
10,601,724 B1* 3/2020 Filsfils .................... H04L 47/70
(Continued)

FOREIGN PATENT DOCUMENTS

CN  107517488 A  12/2017
CN  108282708 A  7/2018
(Continued)

OTHER PUBLICATIONS

International Searching Authority. International Search Report and Written Opinion for PCT Application No. PCT/CN2020/137252 and English translation, mailed Mar. 8, 2021, pp. 1-10.
(Continued)

*Primary Examiner* — Sargon N Nano
(74) *Attorney, Agent, or Firm* — Vivacqua Crane, PLLC

(57) ABSTRACT

A routing method, a routing device and a computer-readable storage medium are disclosed. The routing method includes: allocating, to each of network slices corresponding to different algorithm types, a segment identifier corresponding to a respective algorithm type, and flooding the segment identifier through an IGP; configuring, for each network slice, a QoS policy corresponding to a respective algorithm type; and, forwarding a packet based on the segment identifier and the QoS policy.

13 Claims, 6 Drawing Sheets

(51) Int. Cl.
*H04L 41/5022* (2022.01)
*H04L 45/00* (2022.01)
*H04L 45/12* (2022.01)
*H04L 45/48* (2022.01)

(52) U.S. Cl.
CPC ............ *H04L 45/302* (2013.01); *H04L 45/32* (2013.01); *H04L 45/48* (2013.01)

(58) Field of Classification Search
USPC .......................................................... 709/238
See application file for complete search history.

(56) References Cited

U.S. PATENT DOCUMENTS

| | | | | |
|---|---|---|---|---|
| 10,764,175 | B1* | 9/2020 | Filsfils | H04L 45/20 |
| 10,938,661 | B1* | 3/2021 | Pignataro | H04L 41/12 |
| 11,095,559 | B1* | 8/2021 | Garvia | H04L 45/124 |
| 2014/0317259 | A1* | 10/2014 | Previdi | H04L 61/30 |
| | | | | 709/223 |
| 2015/0109902 | A1* | 4/2015 | Kumar | H04L 45/22 |
| | | | | 370/219 |
| 2015/0200843 | A1* | 7/2015 | Frost | H04L 45/24 |
| | | | | 370/235 |
| 2017/0346718 | A1* | 11/2017 | Psenak | H04L 45/02 |
| 2018/0262585 | A1 | 9/2018 | Zandi et al. | |
| 2018/0270743 | A1* | 9/2018 | Callard | H04W 28/0268 |
| 2019/0230115 | A1* | 7/2019 | Barton | H04L 45/34 |
| 2019/0273678 | A1 | 9/2019 | Peng et al. | |
| 2020/0008067 | A1* | 1/2020 | Filsfils | H04L 47/825 |
| 2020/0322261 | A1* | 10/2020 | Hu | H04L 45/34 |
| 2021/0126831 | A1* | 4/2021 | Filsfils | H04W 76/12 |
| 2021/0250281 | A1* | 8/2021 | Li | H04L 45/42 |
| 2021/0377155 | A1* | 12/2021 | Chen | H04L 45/02 |
| 2022/0174009 | A1* | 6/2022 | Qiu | H04L 45/74 |

FOREIGN PATENT DOCUMENTS

| | | | | |
|---|---|---|---|---|
| CN | 108810903 | A | 11/2018 | |
| CN | 108964961 | A | 12/2018 | |
| CN | 109040322 | A | 12/2018 | |
| CN | 109062501 | A | 12/2018 | |
| CN | 109743213 | A | 5/2019 | |
| CN | 110535766 | A | 12/2019 | |
| EP | 3624408 | A1* | 3/2020 | H04L 41/0806 |
| EP | 4106393 | A1* | 12/2022 | H04L 43/067 |
| EP | 4239973 | A1* | 9/2023 | H04L 41/082 |
| WO | 2018201822 | A1 | 11/2018 | |

OTHER PUBLICATIONS

The State Intellectual Property Office of People's Republic of China. First Office Action for CN Application No. 2020101022200 and English translation, mailed Jul. 25, 2023, pp. 1-14.

The State Intellectual Property Office of People's Republic of China. First Search Report for CN Application No. 2020101022200 and English translation, mailed Jul. 19, 2023, pp. 1-6.

European Patent Office. Extended European Search Report for EP Application No. 20920203.5, mailed Jan. 5, 2024, pp. 1-9.

Psenak, et al. "IGP Flexible Algorithm draft-ietf-lsr-flex-algo-00.txt," Internet Engineering Task Force (IETF), May 15, 2018, pp. 1-23.

* cited by examiner

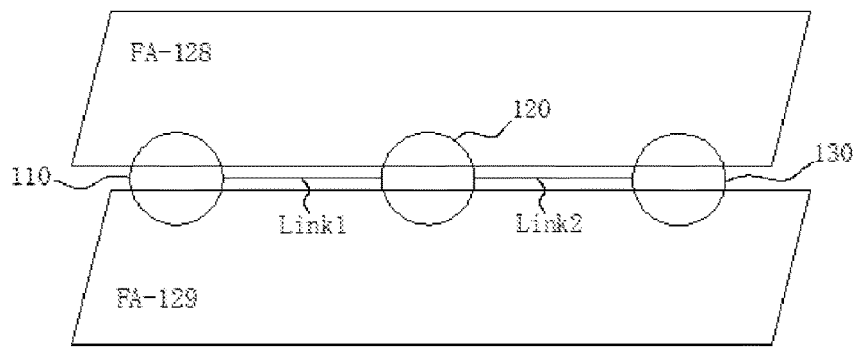
FIG. 1
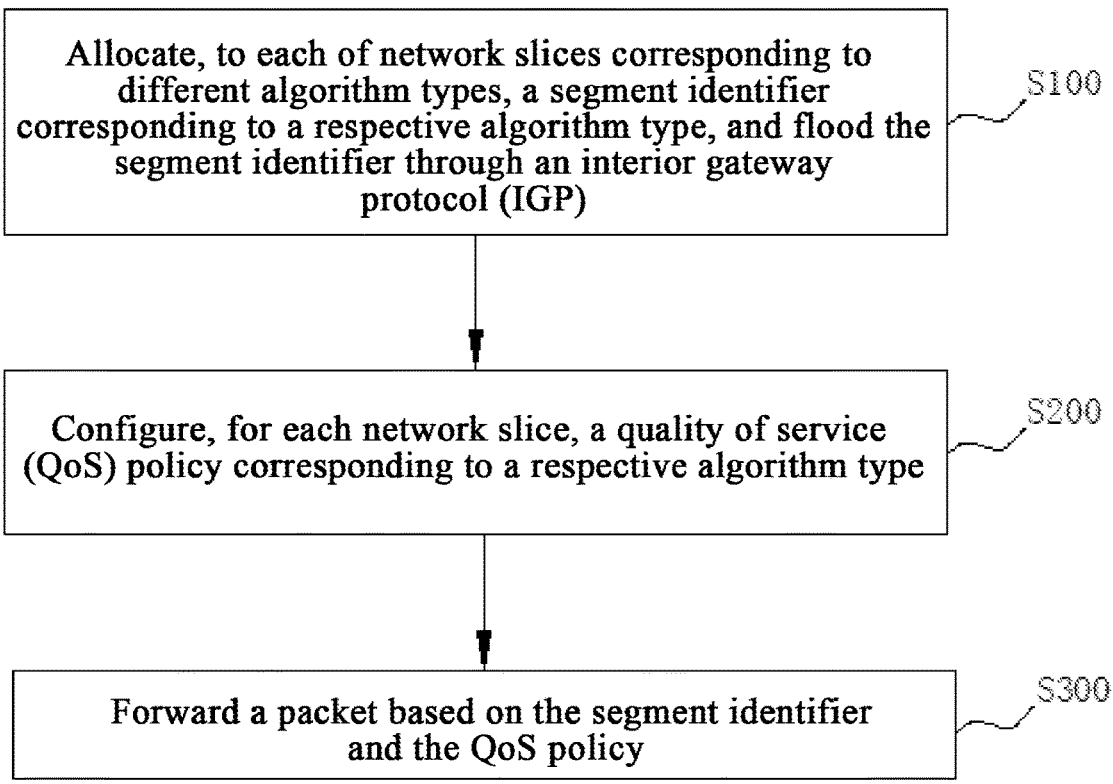
FIG. 2
| Type | Length | Flags | Algorithm |
|---|---|---|---|
| Weight | | | |
| SID/Label/Index (variable) | | | |
FIG. 3A

| Type | Length | Flags | Algorithm |
|---|---|---|---|
| Weight | | | |
| Neighbor System-ID (ID length octets) | | | |
| | | | |
| SID/Label/Index (variable) | | | |

FIG. 3B

| Type | | Length | |
|---|---|---|---|
| Flags | Algorithm | MT-ID | Weight |
| SID/Label/Index (variable) | | | |

FIG. 4A

| Type | | Length | |
|---|---|---|---|
| Flags | Algorithm | MT-ID | Weight |
| Neighbor ID | | | |
| SID/Label/Index (variable) | | | |

FIG. 4B

| Type | | Length | |
|---|---|---|---|
| Flags | Weight | Algorithm | Reserved |
| SID/Label/Index (variable) | | | |

FIG. 5A

ROUTING METHOD, ROUTING DEVICE AND COMPUTER-READABLE STORAGE MEDIUM

CROSS-REFERENCE TO RELATED APPLICATION

This application is a national stage filing under 35 U.S.C. § 371 of international application number PCT/CN2020/137252, filed Dec. 17, 2020, which claims priority to Chinese patent application No. 202010102220.0 filed Feb. 19, 2020. The contents of these applications are incorporated herein by reference in their entirety.

TECHNICAL FIELD

Embodiments of the disclosure relate to, but not limited to, the technical field of communication, and in particular to a routing method, a routing device and a computer-readable storage medium.

BACKGROUND

The core requirement of 5G network slices for the bearer network is that different network slices need to have dedicated bearer sub-networks. Different dedicated bearer sub-networks may be in strict resource hard isolation, or in soft isolation which achieves similar hard isolation effect. Since the packet network cannot support hard isolation, in order to support the requirements of 5G network slices, the packet network needs to slice underlying network resources to satisfy the requirements of different upper-layer services. The existing method is to use an Interior Gateway Protocol (IGP) Flex Algorithm (FA) technology. Multiple IGP algorithms are run in the same topology to obtain multiple FA planes. Each FA plane may represent a network slice, and different upper-layer service traffics can be carried on different FA planes.

However, when multiple network slices share the same link, the current FA technology cannot support the differentiation of Quality of Service (QoS) polices among different network slices on the same link. In the existing mechanisms, only the conventional QoS policy can be configured on the link. For example, corresponding QoS policies are implemented on the traffics sent to the link according to the result of traffic classification. However, this traffic classification method is only related to the link but not related to different network slices sharing the link, so it is impossible to distinguish between the traffics of different network slices. In addition, the QoS policy implemented according to this traffic classification method is also not related to the network slices. That is, multiple network slices sharing the link share the QoS policy configured on the link, and it is impossible to implement differentiated QoS polices for different network slices.

SUMMARY

The summary of the subject matter detailed herein will be given below. The summary is not intended to limit the protection scope of the claims.

In accordance with a first aspect of the disclosure, an embodiment provides a routing method, a routing device and a computer-readable storage medium.

In accordance with a second aspect of the disclosure, an embodiment provides a routing method, including: allocating, to each of network slices corresponding to different algorithm types, a segment identifier corresponding to a respective algorithm type, and flooding the segment identifier through an Interior Gateway Protocol (IGP); configuring, for each network slice, a Quality of Service (QoS) policy corresponding to the respective algorithm type; and, forwarding a packet based on the segment identifier and the QoS policy.

In accordance with a third aspect of the disclosure, an embodiment further provides a routing method, including: receiving different segment identifiers flooded through an IGP, different segment identifiers corresponding to different algorithm types and different network slices, respectively, and different network slices corresponding to different algorithm types; and, receiving packets forwarded based on different segment identifiers and different QoS policies, different QoS policies being configured for different network slices, and different QoS policies corresponding to different algorithm types.

In accordance with a fourth aspect of the disclosure, an embodiment further provides a routing device, including: a memory, a processor and computer programs stored on the memory and executable by the processor which, when executed by the processor, cause the processor to implement the routing method described in the second aspect or the routing method described in the third aspect.

In accordance with a fifth aspect of the disclosure, an embodiment further provides a computer-readable storage medium storing computer-executable instructions which, when executed by a processor, cause the processor to implement the routing method described above.

Other features and advantages of the disclosure will be explained in the following description, and will partially become apparent from the description or be appreciated by implementing the disclosure. The objectives and other advantages of the disclosure may be achieved and obtained by the structures specified in the description, the claims and the accompanying drawings.

BRIEF DESCRIPTION OF DRAWINGS

The accompanying drawings are provided for further understanding of the technical schemes of the disclosure and constitute a part of this description. The accompanying drawings are used in conjunction with the embodiments of the disclosure to illustrate the technical schemes of the disclosure, and are not intended to limit the technical schemes of the disclosure.

FIG. 1 is a schematic diagram of a network topology for executing a routing method according to an embodiment of the disclosure;

FIG. 2 is a flowchart of a routing method according to an embodiment of the disclosure;

FIG. 3A is a schematic diagram of a segment identifier substructure with a field for representing an algorithm type according to an embodiment of the disclosure;

FIG. 3B is a schematic diagram of a segment identifier substructure with a field for representing an algorithm type according to another embodiment of the disclosure;

FIG. 4A is a schematic diagram of a segment identifier substructure with a field for representing an algorithm type according to another embodiment of the disclosure;

FIG. 4B is a schematic diagram of a segment identifier substructure with a field for representing an algorithm type according to another embodiment of the disclosure;

FIG. 5A is a schematic diagram of a segment identifier substructure with a field for representing an algorithm type according to another embodiment of the disclosure;

DETAILED DESCRIPTION

Figures 5B, 6:
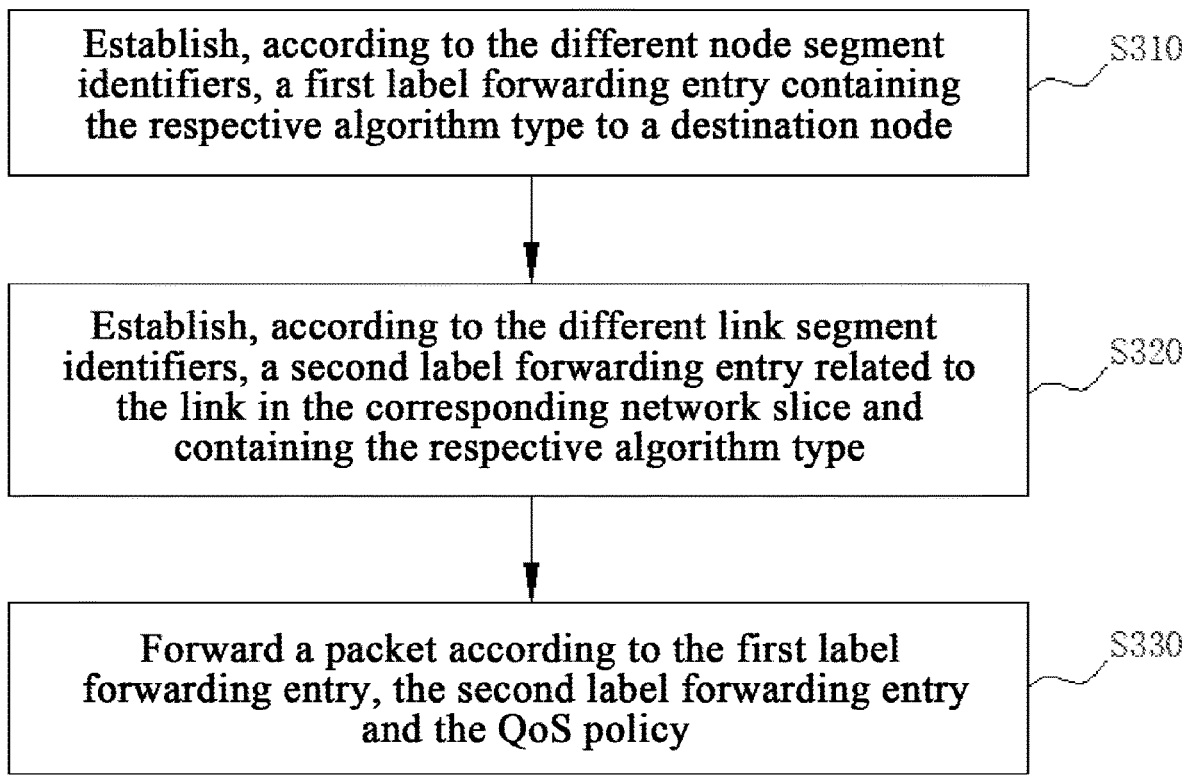
FIG. 5B is a schematic diagram of a segment identifier substructure with a field for representing an algorithm type according to another embodiment of the disclosure.
FIG. 6 is a flowchart of forwarding a packet in the routing method according to another embodiment of the disclosure.

To make the objectives, technical schemes and advantages of the disclosure clearer, the disclosure will be further described below in detail by embodiments in conjunction with the accompanying drawings. It should be understood that the specific embodiments described herein are presented for purpose of illustration only but not for limitation of the disclosure.

It is to be noted that, although functional modules have been divided in the schematic diagrams of devices and the logical orders have been shown in the flowcharts, in some cases, the modules may be divided in a different manner, or the steps shown or described may be executed in an order different from the orders as shown in the flowcharts. The terms such as "first" and "second" in the description, the claims, and the accompanying drawings are used for distinguishing similar objects, and are not necessarily used to describe a specific sequence or a precedence order.

The embodiments of the disclosure provide a routing method, a routing device and a computer-readable storage medium. By allocating, to each of network slices corresponding to different algorithm types, a segment identifier corresponding to a respective algorithm type, and flooding the segment identifier through an IGP, each node in the current IGP protocol domain may store the segment identifiers of all nodes in the current IGP protocol domain corresponding to respective algorithm types. Thus, when the packets of different network slices are forwarded in the current IGP protocol domain according to the segment identifiers, the packets can be distinguished according to different algorithm types, that is, the traffics among different network slices can be distinguished and isolated from one another. Since the packet is forwarded based on the segment identifier corresponding to the respective algorithm type, even if different network slices share a same link, the traffics among different network slices can be distinguished and isolated from one another. In addition, since a QoS policy corresponding to a respective algorithm type is configured for each network slice, different network slices may correspond to different QoS polices. When the packets of different network slices are forwarded in the current IGP protocol domain according to the corresponding segment identifiers, the packet of each network slice can correspond to a QoS policy, so that differentiated QoS policies can be implemented for different network slices. Moreover, since the packets of different network slices correspond to different segment identifiers and QoS policies, even if different network slices share a same link, differentiated QoS policies can also be implemented for different network slices.

The embodiments of the disclosure will be further described below with reference to the accompanying drawings.

As shown in FIG. 1, FIG. 1 is a schematic diagram of a network topology for executing a routing method according to an embodiment of the disclosure. In the example of FIG. 1, the network topology includes a first node 110, a second node 120 and a third node 130 which are connected successively, where two adjacent nodes are connected through a physical link. The first node 110, the second node 120 and the third node 130 may be network devices such as routers or switches, which can forward packets. In addition, the network topology may further include a network controller (not shown in FIG. 1), for example, a Software Defined Network (SDN) controller, etc. The network controller is connected to the first node 110, the second node 120 and the third node 130, respectively, and can control the first node 110, the second node 120 and the third control 130, respectively.

Each of the first node 110, the second node 120, the third node 130 and the network controller includes a memory and a processor. The memory and the processor may be connected via a bus or in other ways.

As a non-temporary computer-readable storage medium, the memory may be configured to store non-temporary software programs and non-temporary computer-executable programs. In addition, the memory may include high-speed random access memories, or may include non-temporary memories, such as at least one disk memory device, flash memory devices or other non-temporary solid-state memory devices. In some implementations, the memory may optionally include memories remotely arranged relative to the processor, and these remote memories may be connected to the processor via a network. Examples of the network include, but not limited to, Internet, Intranet, local area networks, mobile communication networks and combinations thereof.

The network topology and application scenario described in this embodiment of the disclosure are used to illustrate the technical schemes in the embodiment of the disclosure more clearly, and do not constitute any limitations to the technical schemes in the embodiment of the disclosure. As known to those having ordinary skill in the art, with the evolution of the network topology and the emergence of new application scenarios, the technical schemes in the embodiment of the disclosure are also applicable to similar technical problems.

It should be understood by those having ordinary skill in the art that, each node and topological structure shown in FIG. 1 do not constitute any limitations to the embodiment of the disclosure, and more or less components than those shown or combinations of some components or different component arrangements may be included.

In the network topology shown in FIG. 1, each node may separately call the stored routing programs to execute the routing method; or, the network controller may call the stored routing programs and cooperate with each node to execute the routing method.

Based on the structures of the network topology, the nodes and the network controller in the network topology, various embodiments of the routing method described in the disclosure are provided.

As shown in FIG. 2, FIG. 2 is a flowchart of a routing method according to an embodiment of the disclosure. The routing method includes, but not limited to, steps S100, S200 and S300.

At S100, a segment identifier corresponding to a respective algorithm type is allocated to each of network slices corresponding to different algorithm types, and the segment identifier is flooded through an IGP.

In an embodiment, multiple IGP algorithms may be run in the same topology by the IGP FA technology to obtain multiple FA planes. Each FA plane represents one network slice, and each network slice corresponds to one algorithm type. On this basis, a segment identifier corresponding to a respective algorithm type is allocated to each of the network slices corresponding to different algorithm types. Thus, one segment identifier is allocated to each network slice, and each segment identifier corresponds to one algorithm type. In addition, by flooding the segment identifier through the IGP, each node in a current IGP protocol domain may store the segment identifiers of all nodes in the current IGP protocol domain. In addition, since the segment identifier corresponding to each network slice corresponds to one algorithm type, when the packets of different network slices are forwarded in the current IGP protocol domain according to the segment identifiers, the packets can be distinguished according to different algorithm types, so that the traffics among different network can be distinguished and isolated. Since the packet is forwarded based on the segment identifier corresponding to the respective algorithm type, even if different network slices share the same link, the traffics among different slices can be distinguished and isolated.

It should be understood by those having ordinary skill in the art that the IGP FA technology is an algorithm applied to the IGP. A set of algorithm constraints can be defined as required, and forwarding paths satisfying the algorithm constraints are generated based on the algorithm constraints, so that network slices dedicated to specific traffic can be generated according to these forwarding paths.

In an embodiment, the segment identifier may have different implementations. For example, when the application scenario is a Segment Routing MPLS (SR-MPLS, segment routing being applied to a multi-protocol label switching forwarding plane) scenario, the segment identifiers allocated to network slices include Prefix Segment Identifiers (Prefix SIDs) corresponding to nodes and Adjacency Segment Identifiers (Adjacency SIDs) corresponding to links. As an example, in the network topology shown in FIG. 1, the first node 110 belongs to a first network slice FA-128 and a second network slice FA-129, so that a first prefix segment identifier Prefix-SID-128 may be allocated for the first network slice FA-128, and a second prefix segment identifier Prefix-SID-129 may be allocated for the second network slice FA-129. Then, the first prefix segment identifier Prefix-SID-128 and the second prefix segment identifier Prefix-SID-129 are flooded through the IGP. Since the first link Link1 connecting with the first node 110 also belongs to the first network slice FA-128 and the second network slice FA-129, the first node 110 may correspondingly allocate a first adjacency segment identifier Adj-SID-128 and a second adjacency segment identifier Adj -SID-129 to the first link Link1 for two network slices (or two corresponding algorithm types). Then, the first adjacency segment identifier Adj-SID-128 and the second adjacency segment identifier Adj-SID-129 are flooded through the IGP. For another example, when the application scenario is a Segment Routing IPv6 (SRv6, segment routing being applied to an IPv6 forwarding plane) scenario, the segment identifiers allocated to network slices include Endpoint Segment Identifiers (END SIDs) corresponding to nodes and three-layer cross connection segment identifiers (END.X SIDs) corresponding to links. As an example, in the network topology shown in FIG. 1, the first node 110 belongs to the first network slice FA-128 and the second network slice FA-129, so that a first endpoint segment identifier END-SID-128 may be allocated for the first network slice FA-128, and a second endpoint segment identifier END-SID-129 may be allocated for the second network slice FA-129. Then, the first prefix segment identifier END-SID-128 and the second prefix segment identifier END-SID-129 are flooded through the IGP. Since the first link Link1 connecting with the first node 110 also belongs to the first network slice FA-128 and the second network slice FA-129, the first node 110 may correspondingly allocate a first three-layer cross connection segment identifier END.X-SID-128 and a second three-layer cross connection segment identifier END.X-SID-129 to the first link Link1 for two network slices (or two corresponding algorithm types). Then, the first three-layer cross connection segment identifier END.X-SID-128 and the second three-layer cross connection segment identifier END.X-SID-129 are flooded through the IGP.

In an embodiment, the allocating, to each of network slices corresponding to different algorithm types, a segment identifier corresponding to a respective algorithm type and flooding the segment identifier through an IGP may have different implementations. For example, the segment identifier corresponding to the respective algorithm type may be announced by extending an Intermediate System to Intermediate System (ISIS) protocol; or, the segment identifier corresponding to the respective algorithm type may be announced by extending the Open Shortest Path First (OSPF) protocol; or, the segment identifier corresponding to the respective algorithm type may be announced by extending the Open Shortest Path First Version 3 (OSPFv3) protocol supporting IPv6. This will not be specifically limited in this embodiment. When the segment identifier corresponding to the respective algorithm type is announced by extending the ISIS protocol, the OSPF protocol or the OSPFv3 protocol, the segment identifier corresponding to the respective algorithm type may be configured in an ISIS protocol message, an OSPF protocol message or an OSPFv3 protocol message by newly adding a field, and the ISIS protocol message, the OSPF protocol message or the OSPFv3 protocol message configured with the segment identifier corresponding to the respective algorithm type may be flooded for diffusion.

At S200, a QoS policy corresponding to a respective algorithm type is configured for each network slice.

In an embodiment, the QoS policy includes one or more of a bandwidth policy, a traffic service level policy, a queue scheduling policy and a discard policy, and may be configured in each network slice according to the actual usage. Since the QoS policy corresponding to the respective algorithm type is configured for each network slice, different network slices can correspond to different QoS policies. When the packets of different network slices are forwarded in the current IGP protocol domain according to the corresponding segment segments, the packet of each network slice can correspond to one QoS policy, so that differentiated QoS policies can be implemented for different network slices. Since the packets of different network slices correspond to different segment identifiers and QoS polices, even if different network slices share the same link, differentiated QoS policies can be implemented for different network slices.

At S300, a packet is forwarded based on the segment identifier and the QoS policy.

At present, in a scenario where different network slices are carried on different links, since the links are independent of each other, the traffic and QoS policies among different network slices can be differentiated. However, when multiple network slices share the same link, the existing FA technology cannot support the traffic differentiation and isolation of different network slices on the same link, and the existing QoS policy mechanism cannot implement differentiated QoS policies for different network slices on the same link either. To solve this problem, this embodiment adopts the steps S100, S200 and S300. By allocating, to each of network slices corresponding to different algorithm types, a segment identifier corresponding to a respective algorithm type, and flooding the segment identifier through an IGP, each node in the current IGP protocol domain may store the segment identifiers of all nodes in the current IGP protocol domain corresponding to respective algorithm types. In addition, by configuring, for each network slice, a QoS policy corresponding to a respective algorithm type, different network slices can correspond to different QoS policies. Thus, when the packets of different network slices are forwarded in the current IGP protocol domain according to the segment identifiers, not only the traffics among different network slices can be distinguished and isolated according to different algorithm types, but also differentiated QoS policies can be implemented for different network slices according to the corresponding QoS policies. Since the packets of network slices are forwarded based on the segment identifiers corresponding to the respective algorithm types and different network slices are configured with the QoS policies corresponding to the respective algorithm types, respectively, even if different network slices share the same link, the traffics among different network slices can be distinguished and isolated, and differentiated QoS policies can be implemented for different network slices.

In an embodiment, when the IGP is an ISIS protocol, an ISIS message with a segment identifier substructure corresponding to the algorithm type is flooded to flood the segment identifier, where a field representing the algorithm type is set in the segment identifier substructure.

In an embodiment, after the segment identifier corresponding to the respective algorithm type is allocated to each network slice and when the IGP is an ISIS protocol, by setting a segment identifier substructure corresponding to a respective algorithm type in the ISIS message and setting a field representing the respective algorithm type in the segment identifier substructure, the ISIS message can announce the segment identifier corresponding to the respective algorithm type to each node during flooding, so that each node may store the segment identifiers corresponding to different algorithm types. Therefore, when the nodes forward packets according to the segment identifiers, the packets can be distinguished according to different algorithm types, so that the traffics among different network slices can be distinguished and isolated.

The following description will be given by way of an example.

In an example, for a non-LAN application scenario, a segment identifier substructure corresponding to the algorithm type, i.e., Adjacency Segment Identifier (Adj-SID) per Algorithm Sub-TLV, is newly added in the ISIS message structure, and is contained in the existing TLV-22, TLV-222, TLV-23, TLV-223 and TLV-141 of the ISIS protocol for announcing. With reference to the segment identifier substructure shown in FIG. 3A, in the segment identifier substructure, an attribute field representing the algorithm type is newly added. In the segment identifier substructure, the main fields are explained below.

Type: occupies 1 byte, and indicates that the segment identifier substructure is a message structure with a field representing the algorithm type.

Algorithm: occupies 1 byte, and is an algorithm type field for indicating that the current adjacency segment identifier is allocated for a particular algorithm type by the corresponding link.

It is to be noted that the explanations of other fields in the segment identifier substructure are the same as those of the corresponding fields contained in the Adjacency Segment Identifier (Adj-SID) Sub-TLV of the existing ISIS message structure and will not be repeated here.

In another example, for an LAN application scenario, a segment identifier substructure corresponding to the algorithm type, i.e., Adjacency Segment Identifier (LAN-Adj-SID) per Algorithm Sub-TLV, is newly added in the ISIS message structure, and is contained in the existing TLV-22, TLV-222, TLV-23 and TLV-223 of the ISIS protocol for announcing. With reference to the segment identifier substructure shown in FIG. 3B, in the segment identifier substructure, an attribute field representing the algorithm type is newly added. In the segment identifier substructure, the main fields are explained below.

Type: occupies 1 byte, and indicates that the segment identifier substructure is a message structure with a field representing the algorithm type.

Algorithm: occupies 1 byte, and is an algorithm type field for indicating that the current adjacency segment identifier is allocated for a particular algorithm type by the corresponding broadcast link.

It is to be noted that the explanations of other fields in the segment identifier substructure are the same as those of the corresponding fields contained in the Adjacency Segment Identifier (LAN-Adj-SID) Sub-TLV of the existing ISIS message structure and will not be repeated here.

In an embodiment, when the IGP is an OSPF protocol, an OSPF message with a segment identifier substructure corresponding to the algorithm type is flooded to flood the segment identifier, where a field representing the algorithm type is set in the segment identifier substructure.

In an embodiment, after the segment identifier corresponding to the respective algorithm type is allocated to each network slice and when the IGP is an OSPF protocol, by setting a segment identifier substructure corresponding to a respective algorithm type in the OSPF message and setting a field representing the respective algorithm type in the segment identifier substructure, the OSPF message can announce the segment identifier corresponding to the respective algorithm type to each node during flooding, so that each node may store the segment identifiers corresponding to different algorithm types. Therefore, when the nodes forward packets according to the segment identifiers, the packets can be distinguished according to different algorithm types, so that the traffics among different network slices can be distinguished and isolated.

The following description will be given by way of an example.

In an example, for a non-LAN application scenario, a segment identifier substructure corresponding to the algorithm type, i.e., Adj-SID per Algorithm Sub-TLV, is newly added in the OSPF message structure, and is contained in an existing Extended Link TLV of the OSPF protocol for announcing. With reference to the segment identifier substructure shown in FIG. 4A, in the segment identifier substructure, an attribute field representing the algorithm type is newly added. In the segment identifier substructure, the main fields are explained below.

Type: occupies 1 byte, and indicates that the segment identifier substructure is a message structure with a field representing the algorithm type.

Algorithm: occupies 1 byte, and is an algorithm type field for indicating that the current adjacency segment identifier is allocated for a particular algorithm type by the corresponding link.

It is to be noted that the explanations of other fields in the segment identifier substructure are the same as those of the corresponding fields contained in the Adj-SID Sub-TLV of the existing OSPF message structure and will not be repeated here.

In another example, for an LAN application scenario, a segment identifier substructure corresponding to the algorithm type, i.e., LAN Adj-SID per Algorithm Sub-TLV, is newly added in the OSPF message structure, and is contained in the existing Extended Link TLV of the OSPF protocol for announcing. With reference to the segment identifier substructure shown in FIG. 4B, in the segment identifier substructure, an attribute field representing the algorithm type is newly added. In the segment identifier substructure, the main fields are explained below.

Type: occupies 1 byte, and indicates that the segment identifier substructure is a message structure with a field representing the algorithm type.

Algorithm: occupies 1 byte, and is an algorithm type field for indicating that the current adjacency segment identifier is allocated for a particular algorithm type by the corresponding broadcast link.

It is to be noted that the explanations of other fields in the segment identifier substructure are the same as those of the corresponding fields contained in the LAN Adj-SID Sub-TLV of the existing OSPF message structure and will not be repeated here.

In an embodiment, when the IGP is an OSPFv3 protocol, an OSPFv3 message with a segment identifier substructure corresponding to the algorithm type is flooded to flood the segment identifier, where a field representing the algorithm type is set in the segment identifier substructure.

In an embodiment, after the segment identifier corresponding to the respective algorithm type is allocated to each network slice and when the IGP is an OSPFv3 protocol, by setting a segment identifier substructure corresponding to a respective algorithm type in the OSPFv3 message and setting a field representing the respective algorithm type in the segment identifier substructure, the OSPFv3 message can announce the segment identifier corresponding to the respective algorithm type to each node during flooding, so that each node may store the segment identifiers corresponding to different algorithm types. Therefore, when the nodes forward packets according to the segment identifiers, the packets can be distinguished according to different algorithm types, so that the traffics among different network slices can be distinguished and isolated.

The following description will be given by way of an example.

In an example, for a non-LAN application scenario, a segment identifier substructure corresponding to the algorithm type, i.e., Adj-SID per Algorithm Sub-TLV, is newly added in the OSPFv3 message structure, and is contained in an existing Router-Link TLV of the OSPFv3 protocol for announcing. With reference to the segment identifier substructure shown in FIG. 5A, in the segment identifier substructure, an attribute field representing the algorithm type is newly added. In the segment identifier substructure, the main fields are explained below.

Type: occupies 1 byte, and indicates that the segment identifier substructure is a message structure with a field representing the algorithm type.

Algorithm: occupies 1 byte, and is an algorithm type field for indicating that the current adjacency segment identifier is allocated for a particular algorithm type by the corresponding link.

It is to be noted that the explanations of other fields in the segment identifier substructure are the same as those of the corresponding fields contained in the Adj-SID Sub-TLV of the existing OSPFv3 message structure and will not be repeated here.

In another example, for an LAN application scenario, a segment identifier substructure corresponding to the algorithm type, i.e., LAN Adj-SID per Algorithm Sub-TLV, is newly added in the OSPFv3 message structure, and is contained in the existing Router-Link TLV of the OSPFv3 protocol for announcing. With reference to the segment identifier substructure shown in FIG. 5B, in the segment identifier substructure, an attribute field representing the algorithm type is newly added. In the segment identifier substructure, the main fields are explained below.

Type: occupies 1 byte, and indicates that the segment identifier substructure is a message structure with a field representing the algorithm type.

Algorithm: occupies 1 byte, and is an algorithm type field for indicating that the current adjacency segment identifier is allocated for a particular algorithm type by the corresponding broadcast link.

It is to be noted that the explanations of other fields in the segment identifier substructure are the same as those of the corresponding fields contained in the LAN Adj-SID Sub-TLV of the existing OSPFv3 message structure and will not be repeated here.

In addition, in an embodiment, the 5220 includes, but not limited to, the following step.

Different QoS policies are configured according to different algorithm types, respectively, and the QoS policies are applied to a link in the network slices corresponding to the respective algorithm types.

In this embodiment, for each node, different QoS policies are configured according to different algorithm types, respectively. Therefore, in each node, each algorithm type corresponds to one QoS policy. In addition, the QoS policies corresponding to the respective algorithm types are applied to the link in the network slices corresponding to the respective algorithm types, so that different network slices sharing the same link can have different QoS policies, and the purpose of implementing differentiated QoS policies for different network slices is achieved.

As an example, in the network topology shown in FIG. 1, since the first node 110 belongs to the first network slice FA-128 and the second network slice FA-129, a first QoS policy is configured for the first network slice FA-128, a second QoS policy is configured for the second network slice FA-129, and the first QoS policy and the second QoS policy are both applied to the first link Link1 connecting with the first node 110. Therefore, the first network slice FA-128 and the second network slice FA-129 running on the first link Link1 can correspondingly have the first QoS policy and the second QoS policy, so that the differentiation of QoS policies among the network slices can be realized.

In addition, in an embodiment, the segment identifier includes a node segment identifier corresponding to a node and a link segment identifier corresponding to a link, and both the node segment identifier and the link segment identifier correspond to a respective algorithm type.

In an embodiment, the node segment identifier corresponding to the node may have different implementations. For example, in an SR-MPLS scenario, the node segment identifier is a prefix segment identifier; while in an SRv6 scenario, the node segment identifier is an endpoint segment identifier. The link segment identifier corresponding to the link may also have different implementations. For example, in an SR-MPLS scenario, the link segment identifier is an adjacency segment identifier; while in an SRv6 scenario, the link segment identifier is a three-layer cross connection segment identifier. The specific types of the node segment identifier and the link segment identifier may be appropriately selected according to actual application scenarios, and will not be limited in the embodiment.

In an embodiment, since both the node segment identifier and the link segment identifier correspond to the respective algorithm type, when the packets of different network slices are forwarded according to the node segment identifiers and the link segment identifiers, the packets can be distinguished according to different algorithm types, so that the traffics among different network slices can be distinguished and isolated. When a packet is transmitted in a link, since the packet is forwarded based on the link segment identifier corresponding to the respective algorithm type, the traffics among different network slices can be distinguished and isolated in the embodiment in a case where different network slices share the same link.

In addition, with reference to FIG. 6, in an embodiment, the step S300 includes, but not limited to, the following steps S310 to S330.

At S310, a first label forwarding entry containing a respective algorithm type to a destination node is established according to the different node segment identifier.

At S320, a second label forwarding entry related to the link in the corresponding network slice and containing the respective algorithm type is established according to the different link segment identifier.

At S330, a packet is forwarded according to the first label forwarding entry, the second label forwarding entry and the QoS policy.

In an embodiment, the routing method shown in FIG. 6 may be applied to the SR-MPLS scenario. In this case, the first label forwarding entry includes an FEC to NHLFE Map (FTN) forwarding entry and an Incoming Label Map (ILM) forwarding entry, and forwarding information contained in both the FTN forwarding entry and the ILM forwarding entry contains the respective algorithm type. The second label forwarding entry includes a label forwarding entry related to the adjacency segment identifier, and the forwarding information contained in the label forwarding entry related to the adjacency segment identifier contains the respective algorithm type. Therefore, when the routing method in the embodiment is applied to the SR-MPLS scenario, packet forwarding can be realized while ensuring that the traffics among different network slices can be distinguished and isolated.

Figure 7:
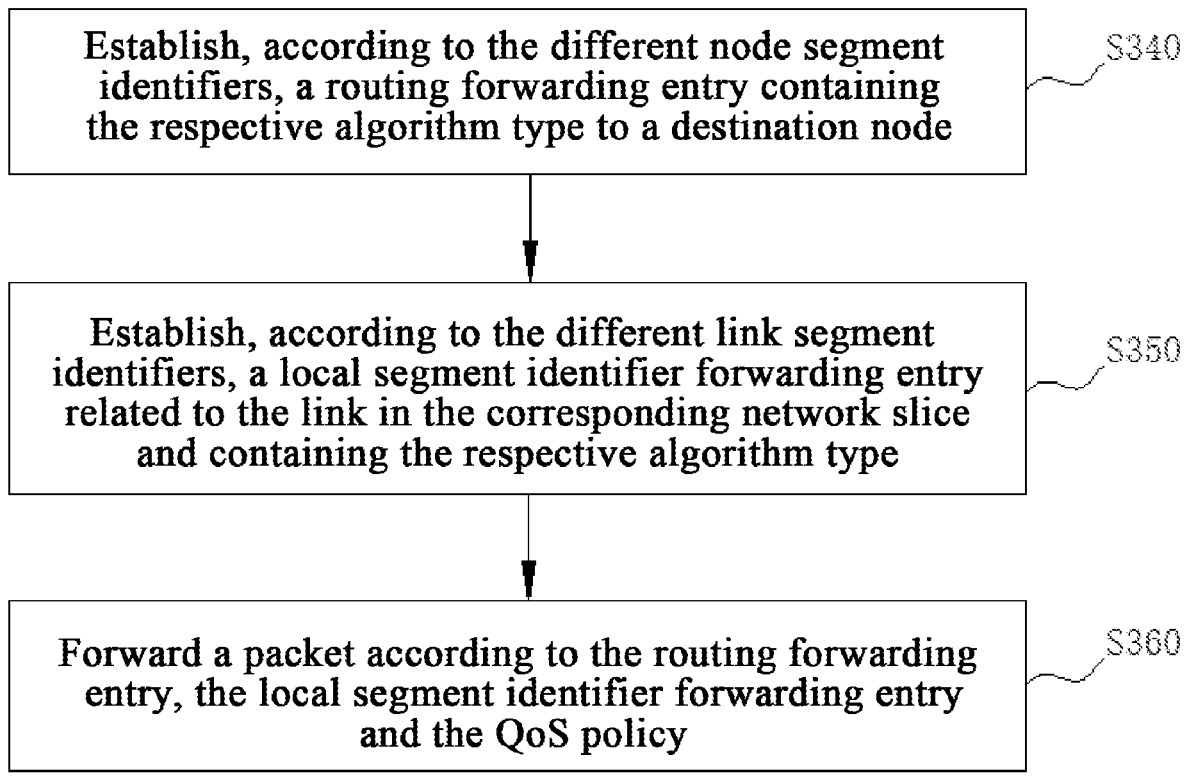
FIG. 7 is a flowchart of forwarding a packet in the routing method according to another embodiment of the disclosure.

In addition, with reference to FIG. 7, in an embodiment, the step S300 includes, but not limited to, the following steps S340 to S360.

At S340, a routing forwarding entry containing the respective algorithm type to a destination node is established according to the different node segment identifiers.

At S350, a local segment identifier forwarding entry related to the link in the corresponding network slice and containing the respective algorithm type is established according to the different link segment identifiers.

At S360, a packet is forwarded according to the routing forwarding entry, the local segment identifier forwarding entry and the QoS policy.

It is to be noted that the embodiment shown in FIG. 6 and the embodiment shown in FIG. 7 are parallel embodiments, and correspond to different application scenarios, respectively.

In an embodiment, the routing method shown in FIG. 7 may be applied to the SRv6 scenario. In this case, the routing forwarding entry is a general routing entry, but the forwarding information contained in the general routing entry contains the respective algorithm type. The local segment identifier forwarding entry is a local SID entry related to the three-layer cross connection segment identifier, and the forwarding information contained in the local SID entry contains the respective algorithm type. Therefore, when the routing method in the embodiment is applied to the SRv6 scenario, packet forwarding can be realized while ensuring that the traffics among different network slices can be distinguished and isolated.

Figure 8:
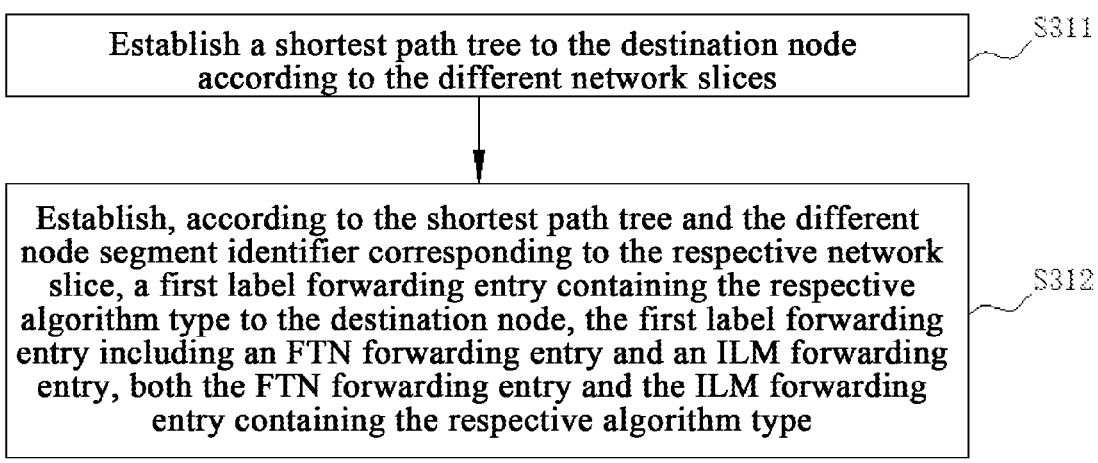
FIG. 8 is a flowchart of establishing a first label forwarding entry in the routing method according to another embodiment of the disclosure.

In addition, with reference to FIG. 8, in an embodiment, the step S310 includes, but not limited to, the following steps S311 to S312.

At S311, a shortest path tree to the destination node is established according to the different network slices.

At S312, a first label forwarding entry containing the respective algorithm type to the destination node is established according to the shortest path tree and the different node segment identifier corresponding to the respective network slice, where the first label forwarding entry includes an FTN forwarding entry and an ILM forwarding entry, and both the FTN forwarding entry and the ILM forwarding entry contain the respective algorithm type.

In an embodiment, after the segment identifier corresponding to the respective algorithm type is allocated to each of network slices corresponding to different algorithm types, each node in the network slice serves as a root node to create a shortest path tree in this network slice, and the nodes in the network slices can obtain paths to other destination nodes according to the shortest path trees corresponding to different root nodes. In this case, the FTN forwarding entry and the ILM forwarding entry both containing the respective algorithm type may be established for each node in the network slice according to the shortest path tree and the different node segment identifier corresponding to the respective network slice. When the packets of different network slices are forwarded in the current IGP protocol domain according to the FTN forwarding entry and the ILM forwarding entry, the packets can be distinguished according to different algorithm types, so that the traffics among different networks can be distinguished and isolated. Since the forwarding information contained in both the FTN forwarding entry and the ILM forwarding entry contains the respective algorithm type, when the packets of different network slices are forwarded along the same link according to the FTN forwarding entry and the ILM forwarding entry, the traffics among different network slices can be distinguished and isolated.

Figure 9:
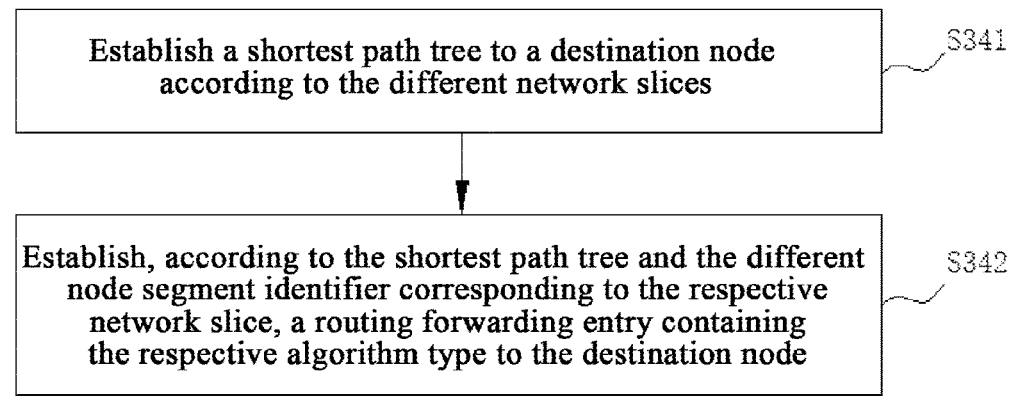
FIG. 9 is a flowchart of establishing a routing forwarding entry in the routing method according to another embodiment of the disclosure.

In addition, with reference to FIG. 9, in an embodiment, the step S340 includes, but not limited to, the following steps S341 to S342.

At S341, a shortest path tree to the destination node is established according to the different network slices.

At 342, a routing forwarding entry containing the respective algorithm type to the destination node is established according to the shortest path tree and the different node segment identifier corresponding to the respective network slice.

In an embodiment, after the segment identifier corresponding to the respective algorithm type is allocated to each of network slices corresponding to different algorithm types, each node in the network slice serves as a root node to create a shortest path tree in this network slice, and the nodes in the network slices can obtain paths to other destination nodes according to the shortest path trees corresponding to different root nodes. In this case, the routing forwarding entry containing the respective algorithm type may be established for each node in the network slice according to the shortest path tree and the different node segment identifier corresponding to the respective network slice. When the packets of different network slices are forwarded in the current IGP protocol domain according to the routing forwarding entry, the packets can be distinguished according to different algorithm types, so that the traffics among different networks can be distinguished and isolated. Since the forwarding information in the routing forwarding entry contains the respective algorithm type, when the packets of different network slices are forwarded along the same link according to the routing forwarding entry, the traffics among different network slices can be distinguished and isolated.

Figure 10:
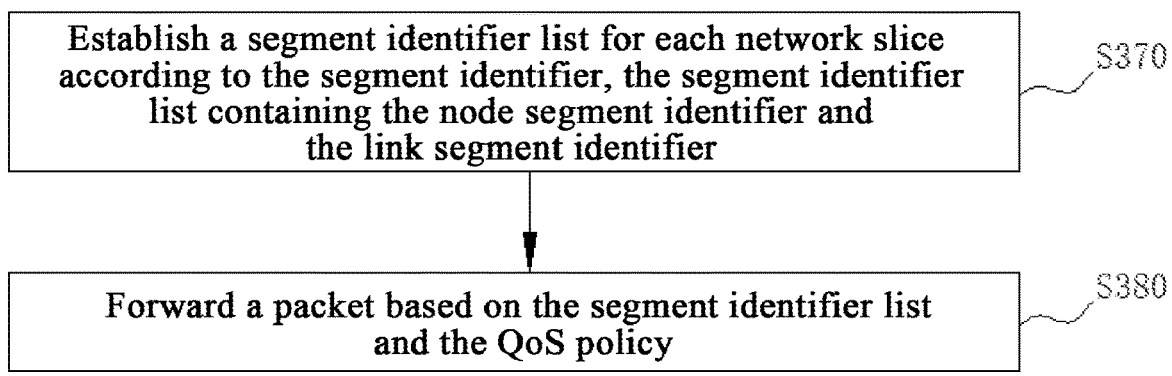
FIG. 10 is a flowchart of forwarding a packet in the routing method according to another embodiment of the disclosure.

In addition, with reference to FIG. 10, in an embodiment, the step S300 includes, but not limited to, the following steps S370 to S380.

At S370, a segment identifier list is established for each network slice according to the segment identifier, where the segment identifier list contains the node segment identifier and the link segment identifier.

At S380, a packet is forwarded based on the segment identifier list and the QoS policy.

It is to be noted that the embodiment shown in FIG. 10, the embodiment shown in FIG. 6 and the embodiment shown in FIG. 7 are parallel embodiments, and correspond to different application scenarios, respectively.

In an embodiment, the routing method shown in FIG. 10 may be applied to the forwarding behavior of segment routing traffic engineering (SR-TE).

In the SR-MPLS scenario, a segment identifier list is established for each network slice according to the segment identifier, that is, different SR-TE tunnels corresponding to respective network slices are established. The segment identifier list in the SR-TE tunnel contains a prefix segment identifier or adjacency segment identifier corresponding to the network slice. During packet forwarding, the packet may be firstly guided to the SR-TE tunnel in the network slice. In this case, the packet is forwarded segment by segment according to the segment identifier list. For example, when a certain segment is a prefix segment, the packet is forwarded according to the label forwarding entry corresponding to the respective prefix segment identifier. For another example, when a certain segment is an adjacency segment, the packet is forwarded according to the label forwarding entry corresponding to the respective adjacency segment identifier. In addition, during packet forwarding, according to the algorithm type contained in the forwarding information, the QoS policy corresponding to this algorithm type is queried, and the QoS policy is applied to the packet. Thus, when the routing method in the embodiment is applied to the SR-MPLS scenario, the traffics among different network slices can be distinguished and isolated, and differentiated QoS policies can be implemented for different network slices.

In the SRv6 scenario, a segment identifier list is established for each network slice according to the segment identifier, that is, different SR-TE tunnels corresponding to respective network slices are established. The segment identifier list in the SR-TE tunnel contains an endpoint segment identifier or a three-layer cross connection segment identifier corresponding to the network slice. During packet forwarding, the packet may be firstly guided to the SR-TE tunnel in the network slice. In this case, the packet is forwarded segment by segment according to the segment identifier list. For the endpoint segment identifier or the three-layer cross connection segment identifier corresponding to each segment, the routing forwarding entry corresponding to a respective destination locator is queried. When the corresponding routing forwarding entry is hit, the routing forwarding entry may be utilized to instruct the packet to be forwarded to an origin node that generates the endpoint segment identifier or the three-layer cross connection segment identifier; and, during the forwarding process, according to the algorithm type contained in the forwarding information, the QoS policy corresponding to this algorithm type is queried and applied to the packet. When the packet reaches the origin node that generates the endpoint segment identifier or the three-layer cross connection segment identifier, the corresponding local segment identifier forwarding entry is queried. When the corresponding local segment identifier forwarding entry (particularly the local segment identifier forwarding entry corresponding to the three-layer cross connection segment identifier) is hit, the packet is continuously instructed to be forwarded to a certain three-layer interface; and, during the forwarding process, according to the algorithm type contained in the forwarding information, the QoS policy corresponding to this algorithm type is queried and applied to the packet. Thus, when the routing method in the embodiment is applied to the SRv6 scenario, the traffics among different network slices can be distinguished and isolated, and differentiated QoS policies can be implemented for different network slices.

The routing method provided in the above embodiments will be described below in detail by way of examples.

EXAMPLE ONE

Figure 11:
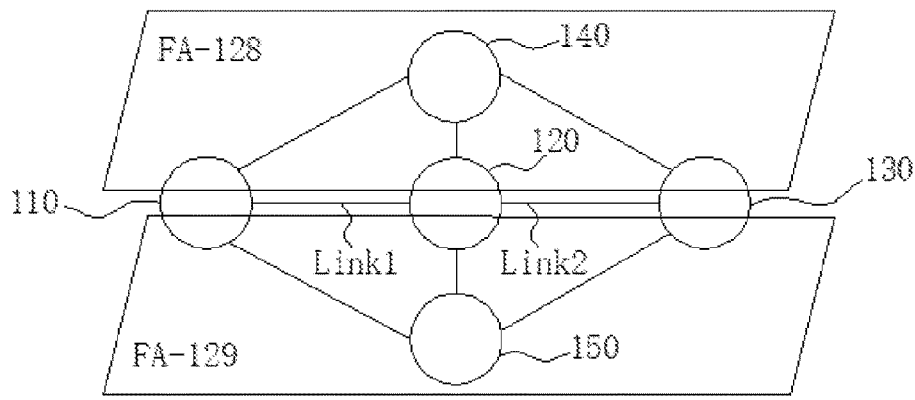
FIG. 11 is a schematic diagram of a network topology for executing a routing method according to another embodiment of the disclosure.

The network topology shown in FIG. 11 includes a first node 110, a second node 120, a third node 130, a fourth node 140 and a fifth node 150. The first node 110, the second node 120 and the third node 130 are connected successively. The fourth node 140, the second node 120 and the fifth node 150 are connected successively. The first node 110, the fifth node 150, the third node 130 and the fourth node 140 are connected successively end to end. In the network topology shown in FIG. 11, a first network slice FA-128 and a second network slice FA-129 are constructed, where an algorithm type corresponding to the first network slice FA-128 has a value defined as 128, and an algorithm type corresponding to the second network slice FA-129 has a value defined as 129. The first network slice FA-128 includes the first node 110, the second node 120, the third node 130, the fourth node 140 and two-way links connected among these nodes. The second network slice FA-129 includes the first node 110, the second node 120, the third node 130, the fifth node 150 and two-way links connected among these nodes. In this example, the first network slice FA-128 and the second network slice FA-129 share a first link Link1 between the first node 110 and the second node 120 and a second link Link2 between the second node 120 and the third node 130. In the first network slice FA-128 and the second network slice FA-129, the shortest forwarding path from the first node 110 serving as a source node to the third node 130 serving as a destination node is the first node 110-the second node 120-the third node 130. When the routing method applied to the SR-MPLS scenario is executed based on the network topology shown in FIG. 11, the process is described below.

Firstly, FTN forwarding entries to the third node 130 are established for the first network slice FA-128 and the second network slice FA-129 in the first node 110, respectively. Key values of the two FTN forwarding entries are <Algorithm 128, prefix-D> and <Algorithm 129, prefix-D>, respectively, where Algorithm 128 represents that the value of the algorithm type is 128, Algorithm 129 represents that the value of the algorithm type is 129, and prefix-D represents a prefix segment identifier to the third node 130. It can be seen that forwarding information contained in the two FTN forwarding entries correspondingly contains an algorithm type having a value of 128 and an algorithm type having a value of 129. In addition, the forwarding information contained in the two FTN forwarding entries further contains a same outgoing interface (the first link Link1) and a next hop (the second node 120).

Similarly, ILM forwarding entries to the third node 130 are established for the first network slice FA-128 and the second network slice FA-129 in the second node 120, respectively. Key values of the two ILM forwarding entries are Label-B-128 and Label-B-129, respectively. The forwarding information contained in the two ILM forwarding entries also correspondingly contains an algorithm type having a value of 128 and an algorithm type having a value of 129. In addition, the forwarding information contained in the two ILM forwarding entries further contains the same outgoing interface (the second link Link2) and a next hop (the third node 130).

Similarly, ILM forwarding entries corresponding to the first network slice FA-128 and the second node slice FA-129 are established for the third node in the third node 130, respectively. Key values of the two ILM forwarding entries are Label-D-128 and Label-D-129, respectively. The forwarding information contained in the two ILM forwarding entries also correspondingly contains an algorithm type having a value of 128 and an algorithm type having a value of 129.

In accordance with the above steps, forwarding paths from the first node 110 serving as the source node to the third node 130 serving as the destination node 130 may be obtained in the first network slice FA-128 and the second network slice FA-129, respectively. Since the two forwarding paths can be distinguished according to the algorithm types, even if different network slices share the same link, the traffics among different network slices can be distinguished and isolated.

In addition, corresponding QoS policies are configured for the two algorithm types in the first node 110, and the two QoS policies are applied to the first link Link1, where the two QoS policies may be labeled as qos-policy-s-128 and qos-policy-s-129, respectively. Similarly, corresponding QoS policies are configured for the two algorithm types in the second node 120, and the two QoS policies are applied to the second link Link2, where the two QoS policies may be labeled as qos-policy-b-128 and qos-policy-b-129, respectively. Similarly, corresponding QoS policies are configured for the two algorithm types in the third node 130, and the two QoS policies are applied to the interior of the third node 130, where the two QoS policies may be labeled as qos-policy-d-128 and qos-policy-d-129, respectively. In addition, it is assumed that, the QoS policies labeled as qos-policy-s-128 and qos-policy-b-128 allow the packet to enter a high-priority queue of an outgoing link, the QoS policies labeled as qos-policy-s-129 and qos-policy-b-129 allow the packet to enter a low-priority queue of the outgoing link, the QoS policy labeled as qos-policy-d-128 allows the packet to have a higher Networking Processing Unit (NPU) scheduling priority, and the QoS policy labeled as qos-policy-d-129 allows the packet to have a lower NPU scheduling priority.

Based on the above network topology state, when the packets of a same type are forwarded from the first node 110 to the third node 130 along the first network slice FA-128 and the second network slice FA-129, respectively, the packets will be encapsulated with an outer MPLS label. In this case, different QoS policies are obtained in the first node 110 according to the different algorithm types contained in the corresponding FTN forwarding entries, and the corresponding QoS policies are then applied to the packets. In this case, for example, the packet belonging to the first network slice FA-128 will enter the high-priority queue in the first link Link1 during forwarding, and the packet belonging to the second network slice FA-129 will enter the low-priority queue in the first link Link1 during forwarding. Similarly, different QoS polices are obtained in the second node 120 according to the different algorithm types contained in the corresponding ILM forwarding entries, and the corresponding QoS policies are then applied to the packets. In this case, for example, the packet belonging to the first network slice FA-128 will enter the high-priority queue in the second link Link2 during forwarding, and the packet belonging to the second network slice FA-129 will enter the low-priority in the second link Link2 during forwarding. Similarly, different QoS policies are obtained in the third node 130 according to the different algorithm types contained in the corresponding ILM forwarding entries, and the corresponding QoS policies are then applied to the packets. In this case, for example, the packet belonging to the first network slice FA-128 may have a higher NPU processing priority, and the packet belonging to the second network slice FA-129 may have a lower NPU processing priority. Thus, even if the first network slice FA-128 and the second network slice FA-129 share the same link, the traffic between the two network slices can be distinguished and isolated, and differentiated QoS policies can be implemented for the two network slices.

EXAMPLE TWO

This example is based on the same network topology as Example one, that is, this example is applied to the network topology shown in FIG. 11. This example differs from Example one in that: this example shows the routing method applied to the SRv6 scenario, while Example one shows the routing method applied to the SR-MPLS scenario. When the routing method applied to the SRv6 scenario is executed based on the network topology shown in FIG. 11, the process is described below.

Firstly, routing forwarding entries to the third node 130 are established for the first network slice FA-128 and the second network slice FA-129 in the first node 110, respectively. Key values of the two routing forwarding entries are <prefix-D-128> and <prefix-D-129>, respectively. Forwarding information contained in the two routing forwarding entries also correspondingly contains an algorithm type having a value of 128 and an algorithm type having a value of 129. In addition, the forwarding information contained in the two routing forwarding entries further contains a same outgoing interface (the first link Link1) and a next hop (the second node 120).

Similarly, routing forwarding entries to the third node 130 are established for the first network slice FA-128 and the second network slice FA-129 in the second node 120, respectively. Key values of the two routing forwarding entries are <prefix-D-128> and <prefix-D-129>, respectively. Forwarding information contained in the two routing forwarding entries also correspondingly contains an algorithm type having a value of 128 and an algorithm type having a value of 129. In addition, the forwarding information contained in the two routing forwarding entries further contains a same outgoing interface (the second link Link2) and a next hop (the third node 130).

Similarity, local segment identifier forwarding entries corresponding to the first network slice FA-128 and the second network slice FA-129 are established for different endpoint segment identifiers in the third node 130, respectively. Forwarding information contained in the two local segment identifier forwarding entries correspondingly contains an algorithm type having a value of 128 and an algorithm type having a value of 129.

In accordance with the above steps, forwarding paths from the first node 110 serving as the source node to the third node 130 serving as the destination node 130 may be obtained in the first network slice FA-128 and the second network slice FA-129, respectively. Since the two forwarding paths can be distinguished according to the algorithm types, even if different network slices share the same link, the traffics among different network slices can be distinguished and isolated.

In addition, the process of configuring QoS policies for network slices according to algorithm types in this example is the same as the process of configuring QoS policies for network slices according to algorithm types in Example one, and will not be repeated here to avoid redundancy.

Based on the network topology state, when the packets of a same type are carried and forwarded from the first node 110 to the third node 130 along the first network slice FA-128 and the second network slice FA-129 in the SRv6 scenario, the packets will be encapsulated with an outer IPv6 header, and the destination IP will be set as the endpoint segment identifier of the destination node in the corresponding network slice. In this case, different QoS policies are obtained in the first node 110 according to the different algorithm types contained in the corresponding routing forwarding entries, and the corresponding QoS policies are then applied to the packets. In this case, for example, the packet belonging to the first network slice FA-128 will enter the high-priority queue in the first link Link1 during forwarding, and the packet belonging to the second network slice FA-129 will enter the low-priority queue in the first link Link1 during forwarding. Similarly, different QoS polices are obtained in the second node 120 according to the different algorithm types contained in the corresponding routing forwarding entries, and the corresponding QoS policies are then applied to the packets. In this case, for example, the packet belonging to the first network slice FA-128 will enter the high-priority queue in the second link Link2 during forwarding, and the packet belonging to the second network slice FA-129 will enter the low-priority in the second link Link2 during forwarding. Similarly, different QoS policies are obtained in the third node 130 according to the different algorithm types contained in the corresponding local segment identifier forwarding entries, and the corresponding QoS policies are then applied to the packets. In this case, for example, the packet belonging to the first network slice FA-128 may have a higher NPU processing priority, and the packet belonging to the second network slice FA-129 may have a lower NPU processing priority. Thus, even if the first network slice FA-128 and the second network slice FA-129 share the same link, the traffic between the two network slices can be distinguished and isolated, and differentiated QoS policies can be implemented for the two network slices.

EXAMPLE THREE

Figure 12:
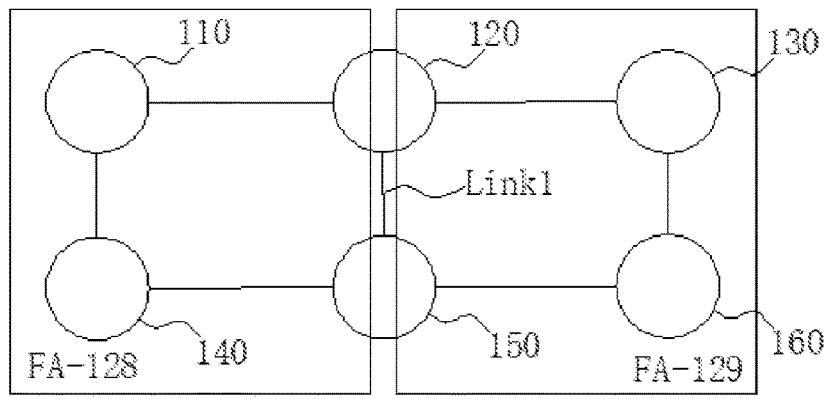
FIG. 12 is a schematic diagram of a network topology for executing a routing method according to another embodiment of the disclosure.

The network topology shown in FIG. 12 includes a first node 110, a second node 120, a third node 130, a fourth node 140, a fifth node 150 and a sixth node 160. The first node 110, the second node 120, the third node 130, the fourth node 140, the fifth node 150 and the sixth node 160 are connected successively end to end, and the second node 120 and the fifth node 150 are connected to each other. In the network topology shown in FIG. 12, a first network slice FA-128 and a second network slice FA-129 are constructed, where an algorithm type corresponding to the first network slice FA-128 has a value defined as 128, and an algorithm type corresponding to the second network slice FA-129 has a value defined as 129. The first network slice FA-128 includes the first node 110, the second node 120, the fifth node 150, the fourth node 140 and two-way links connected among these nodes. The second network slice FA-129 includes the second node 120, the third node 130, the fifth node 150, the sixth node 160 and two-way links connected among these nodes. In this example, the first network slice FA-128 and the second network slice FA-129 share a first link Link1 between the second node 120 and the fifth node 150. In addition, in the first network slice FA-128, the shortest forwarding path from the first node 110 serving as a source node to the second node 120 serving as a destination node is the first node 110-the second node 120, and a Topology Independent Loop-Free Alternate (TI-LFA) backup path is {the fifth node 150, the fifth node 150-the second node 120}. In the second network slice FA-129, the shortest forwarding path from the third node 130 serving as a source node to the second node 120 serving as a destination node is the third node 130-the second node 120, and the TI-LFA backup path is also {the fifth node 150, the fifth node 150-the second node 120}. It is assumed that, when a packet is forwarded along the TI-LFA backup path, the packet is first forwarded to the fifth node 150 and then forwarded to the second node 120 along the first link Link1. When the routing method applied in the SR-MPLS scenario is executed based on the network topology shown in FIG. 12, the process is described below.

In the first network slice FA-128, the segment identifier list corresponding to the TI-LFA backup path {the fifth node 150, the fifth node 150-the second node 120} in the first node 110 may be represented as {prefix-d-sid-128, adj-d-link1-sid-128}. In the second network slice FA-129, the segment identifier list corresponding to the TI-LFA backup path {the fifth node 150, the fifth node 150-the second node 120} in the third node 130 may be represented as {prefix-d-sid-129, adj-d-link1-sid-129}.

In the fifth node 150, different ILM forwarding entries are established for the adj-d-link1-sid-128 in the first network slice FA-128 and the adj-d-link1-sid-129 in the second network slice FA-129, respectively. The forwarding information contained in the two ILM forwarding entries correspondingly contains an algorithm type having a value of 128 and an algorithm type having a value of 129. In addition, the forwarding information contained in the two ILM forwarding entries further contains a same outgoing interface (the first link Link1) and a next hop (the second node 120).

In addition, corresponding QoS policies are configured for the two algorithm types in the fifth node 150, and the two QoS policies are applied to the first link Link1, where the two QoS policies may be labeled as qos-policy-b-128 and qos-policy-b-129, respectively. If it is assumed that the QoS policy labeled as qos-policy-b-128 allows the packet to enter a high-priority queue in the first link Link1 and the QoS policy labeled as qos-policy-b-129 allows the packet to enter a low-priority queue in the first link Link1, when the packets of a same type are forwarded according to the TI-LFA backup path along the first network slice FA-128 and the second network slice FA-129, respectively, different QoS policies are obtained according to the different algorithm types contained in the corresponding ILM forwarding entries, and the corresponding QoS policies are applied to the packets. In this case, the packet belonging to the first network slice FA-128 will enter the high-priority queue in the first link Link1 during forwarding, and the packet belonging to the second network slice FA-129 will enter the low-priority queue in the first link Link1 during forwarding. Thus, even if the first network slice FA-128 and the second network slice FA-129 share the same link, the traffic between the two network slices can be distinguished and isolated, and differentiated QoS policies can be implemented for the two network slices.

EXAMPLE FOUR

This example is based on the same network topology as Example three, that is, this example is applied to the network topology shown in FIG. 12. This example differs from Example 3 in that: this example shows the routing method applied to the SRv6 scenario, while Example three shows the routing method applied to the SR-MPLS scenario. When the routing method applied to the SRv6 scenario is executed based on the network topology shown in FIG. 12, the process is described below.

In the first network slice FA-128, the segment identifier list corresponding to the TI-LFA backup path {the fifth node 150, the fifth node 150-the second node 120} in the first node 110 may be represented as {end-b-sid-128, endx-b-link1-sid-128}. In the second network slice FA-129, the segment identifier list corresponding to the TI-LFA backup path {the fifth node 150, the fifth node 150-the second node 120} in the third node 130 may be represented as {end-b-sid-129, endx-b-link1-sid-129}.

In the fifth node 150, different local segment identifier forwarding entries are established for the endx-b-link1-sid-128 in the first network slice FA-128 and the endx-b-link1-sid-129 in the second network slice FA-129, respectively. The forwarding information contained in the two local segment identifier forwarding entries correspondingly contains an algorithm type having a value of 128 and an algorithm type having a value of 129. In addition, the forwarding information contained in the two local segment identifier forwarding entries further contains the same outgoing interface (the first link Link1) and a next hop (the second node 120).

In addition, corresponding QoS policies are configured for the two algorithm types in the fifth node 150, and the two QoS policies are applied to the first link Link1, where the two QoS policies may be labeled as qos-policy-b-128 and qos-policy-b-129, respectively. If it is assumed that the QoS policy labeled as qos-policy-b-128 allows the packet to enter the high-priority queue in the first link Link1 and the QoS policy labeled as qos-policy-b-129 allows the packet to enter the low-priority queue in the first link Link1, when the packets of a same type are forwarded according to the TI-LFA backup path along the first network slice FA-128 and the second network slice FA-129, respectively, different QoS policies are obtained according to the different algorithm types contained in the corresponding local segment identifier forwarding entries, and the corresponding QoS policies are applied to the packets. In this case, the packet belonging to the first network slice FA-128 will enter the high-priority queue in the first link Link1 during forwarding, and the packet belonging to the second network slice FA-129 will enter the low-priority queue in the first link Link1 during forwarding. Thus, even if the first network slice FA-128 and the second network slice FA-129 share the same link, the traffic between the two network slices can be distinguished and isolated, and differentiated QoS policies can be implemented for the two network slices.

Figure 13:
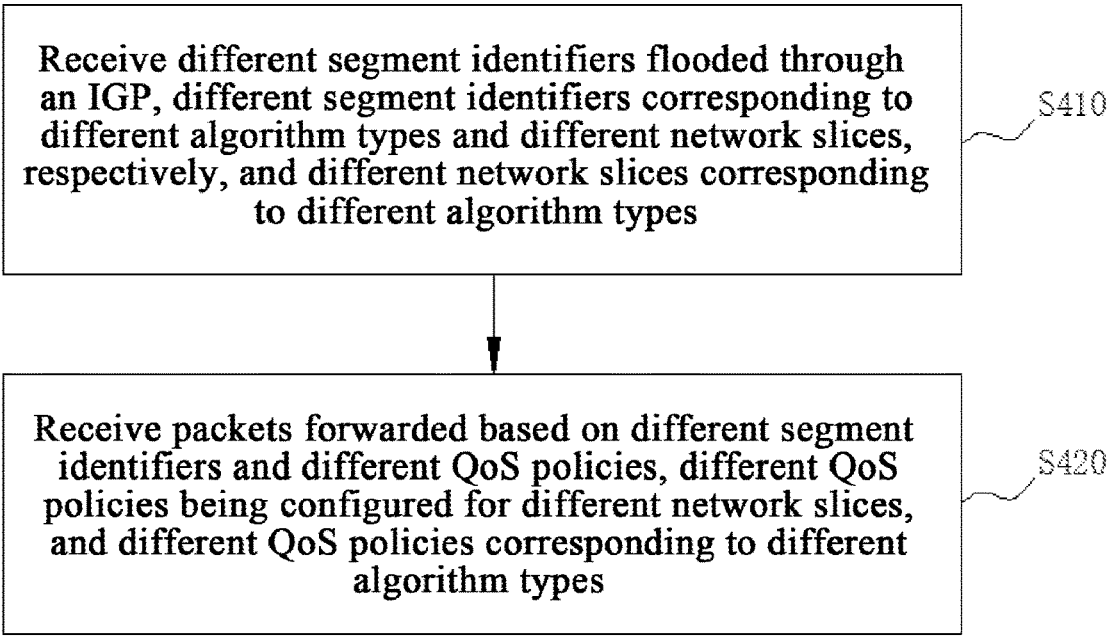
FIG. 13 is a flowchart of a routing method according to another embodiment of the disclosure.

In addition, an embodiment of the disclosure further provides a routing method. As shown in FIG. 13, FIG. 13 is a flowchart of a routing method according to an embodiment of the disclosure. The routing method may be applied to different nodes in the embodiment shown in FIG. 1, 11 or 12, and the routing method includes, but not limited to, the following steps S410 to S420.

At S410, different segment identifiers flooded through an IGP are received, where different segment identifiers correspond to different algorithm types and different network slices, respectively, and different network slices correspond to different algorithm types.

At S420, packets forwarded based on different segment identifiers and different QoS policies are received, where different QoS policies are configured for different network slices, and different QoS policies correspond to different algorithm types.

In an embodiment, by receiving messages flooded through the IGP, each node in the current IGP protocol domain may store the segment identifiers of all nodes in the current IGP protocol domain. In addition, since the segment identifier corresponding to each network slice corresponds to one algorithm type, when the packets from different network slices forwarded according to the segment identifiers are received in the current IGP protocol domain, the packets can be distinguished according to different algorithm types, so that the traffics among different network slices can be distinguished and isolated. Since the received packets are forwarded based on the segment identifiers corresponding to the respective algorithm types, even if different network slices share the same link, the traffics among different network slices can be distinguished and isolated.

It should be understood by those having ordinary skill in the art that the IGP FA technology is an algorithm applied to the IGP. A set of algorithm constraints can be defined as required, and forwarding paths satisfying the algorithm constraints are generated based on the algorithm constraints, so that network slices dedicated to specific traffic can be generated according to these forwarding paths.

It is to be noted that, like the segment identifier in the embodiment shown in FIG. 2, the segment identifier in this embodiment may also have different implementations. The implementation of the segment identifier in this embodiment is the same as that of the segment identifier in the embodiment shown in FIG. 2, and the content may refer to the corresponding part of the embodiment shown in FIG. 2 and will not be repeated here to avoid redundancy.

In an embodiment, the QoS policy includes one or more of a bandwidth policy, a traffic service level policy, a queue scheduling policy and a discard policy, and may be configured in each network slice according to the actual usage. Since different QoS policies are configured for different network slices and different QoS policies correspond to different algorithm types, when the packets from different network slices forwarded according to the corresponding segment identifiers are received in the current IGP protocol domain, each packet will correspond to one QoS policy, so that differentiated QoS policies can be implemented for different network slices. Since the packets of different network slices correspond to different segment identifiers and QoS policies, even if different network slices share the same link, differentiated QoS policies can be implemented for different network slices.

In an embodiment, when the IGP is an ISIS protocol, ISIS messages with segment identifier substructures corresponding to the algorithm types are received to receive the segment identifiers, where fields representing the algorithm types are set in the segment identifier substructures.

In an embodiment, when the IGP protocol is an ISIS protocol, since the segment identifier substructures corresponding to the algorithm types are set in the ISIS messages and the fields representing the algorithm types are set in the segment identifier substructures, when a current node receives the ISIS message flooded from each node, the segment identifiers corresponding to different algorithm types can be received. Thus, by distinguishing according to different algorithm types, the traffics among different network slices can be distinguished and isolated.

It is to be noted that the example of the segment identifier substructure corresponding to the algorithm type set in the ISIS message may refer to the example shown in FIG. 3A or the example shown in FIG. 3B, and will not be repeated here to avoid redundancy.

In an embodiment, when the IGP is an OSPF protocol, OSPF messages with segment identifier substructures corresponding to the algorithm types are received to receive the segment identifiers, where fields representing the algorithm types are set in the segment identifier substructures.

In an embodiment, when the IGP protocol is an OSPF protocol, since the segment identifier substructures corresponding to the algorithm types are set in the OSPF messages and the fields representing the algorithm types are set in the segment identifier substructures, when the current node receives the OSPF message flooded from each node, the segment identifiers corresponding to different algorithm types can be received. Thus, by distinguishing according to different algorithm types, the traffics among different network slices can be distinguished and isolated.

It is to be noted that the example of the segment identifier substructures corresponding to the algorithm type set in the OSPF message may refer to the example shown in FIG. 4A or the example shown in FIG. 4B, and will not be repeated here to avoid redundancy.

In an embodiment, when the IGP is an OSPFv3 protocol, OSPFv3 messages with segment identifier substructures corresponding to the algorithm types are received to receive the segment identifiers, where fields representing the algorithm types are set in the segment identifier substructures.

In an embodiment, when the IGP protocol is an OSPFv3 protocol, since the segment identifier substructures corresponding to the algorithm types are set in the OSPFv3 messages and the fields representing the algorithm types are set in the segment identifier substructures, when the current node receives the OSPFv3 message flooded from each node, the segment identifiers corresponding to different algorithm types can be received. Thus, by distinguishing according to different algorithm types, the traffics among different network slices can be distinguished and isolated.

It is to be noted that the example of the segment identifier substructure corresponding to the algorithm type set in the OSPFv3 message may refer to the example shown in FIG. 5A or the example shown in FIG. 5B, and will not be repeated here to avoid redundancy.

In addition, in an embodiment, the segment identifier includes a node segment identifier corresponding to a node and a link segment identifier corresponding to a link, and both the node segment identifier and the link segment identifier correspond to a respective algorithm type.

In an embodiment, the node segment identifier corresponding to the node may have different implementations. For example, in an SR-MPLS scenario, the node segment identifier is a prefix segment identifier; while in an SRv6 scenario, the node segment identifier is an endpoint segment identifier. The link segment identifier corresponding to the link may also have different implementations. For example, in an SR-MPLS scenario, the link segment identifier is an adjacency segment identifier; while in an SRv6 scenario, the link segment identifier is a three-layer cross connection segment identifier. The specific types of the node segment identifier and the link segment identifier may be appropriately selected according to actual application scenarios, and will not be limited in the embodiment.

In an embodiment, since both the node segment identifier and the link segment identifier correspond to the respective algorithm type, when the packets from different network slices forwarded according to the node segment identifiers and the link segment identifiers are received, the packets can be distinguished according to different algorithm types, so that the traffics among different network slices can be distinguished and isolated. Since the transmission of a packet in a link is forwarded based on the link segment identifier corresponding to the respective algorithm type, even if different network slices share the same link, the traffics among different network slices can be distinguished and isolated in the embodiment by distinguishing according to different algorithm types.

Figure 14:
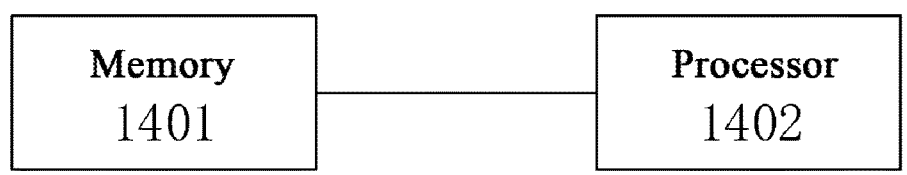
FIG. 14 is a schematic diagram of a routing device according to an embodiment of the disclosure.

In addition, with reference to FIG. 14, an embodiment of the disclosure further provides a routing device. The device includes: a memory 1401, a processor 1402 and computer programs that are stored on the memory 1401 and executable by the processor 1402.

The processor 1402 and the memory 1401 may be connected via a bus or in other ways.

It is to be noted that the routing device in the embodiment can be applied to different nodes or network controllers in the embodiment shown in FIG. 1, FIG. 11 or FIG. 12. The node or network controller including the routing device in the embodiment can constitute a part of the network topology in the embodiment shown in FIG. 1, FIG. 11 or FIG. 12. These embodiments belong to the same inventive concept, so these embodiments have the same implementation principles and technical effects and will not be described in detail here.

The non-temporary software programs and instructions needed to implement the routing method in the above embodiments are stored in the memory which, when executed by the processor, cause the processor to execute the routing method in the above embodiments, for example, executing the steps S100 to S300 in the method of FIG. 2, the steps S310 to S330 in the method of FIG. 6, the steps S340 to S360 in the method of FIG. 7, the steps S311 to S312 in the method of FIG. 8, the steps S341 to S342 in the method of FIG. 9, the steps S370 to S380 in the method of FIG. 10 and the steps S410 to S420 in the method of FIG. 13.

The device embodiments described above are only illustrative. The units described as separate components may be or may not be physically separated from each other, that is, they may be located in one place or may be distributed on multiple network units. Some or all of the modules may be selected according to actual needs to achieve the objectives of the schemes of the embodiments.

In addition, an embodiment of the disclosure further provides a computer-readable storage medium. The computer-readable storage medium stores computer-executable instructions which, when executed by a processor or a controller, e.g., by a processor in the embodiment of the routing device, cause the processer to execute the routing method in the above embodiments, e.g., executing the steps S100 to S300 in the method of FIG. 2, the steps S310 to S330 in the method of FIG. 6, the steps S340 to S360 in the method of FIG. 7, the steps S311 to S312 in the method of FIG. 8, the steps S341 to S342 in the method of FIG. 9, the steps S370 to S380 in the method of FIG. 10 and the steps S410 to S420 in the method of FIG. 13.

In the embodiment of the disclosure, by configuring corresponding segment identifiers and QoS policies according to the corresponding algorithm types, the traffics among different network slices sharing the same link can be distinguished and isolated, and differentiated QoS policies can be implemented for different network slices.

The embodiments of the disclosure provide a routing method, a routing device and a computer-readable storage medium. Thus, the traffics among different network slices sharing the same link can be distinguished and isolated, and differentiated QoS policies can be implemented for different network slices.

The routing method in the embodiments of the disclosure includes: allocating, to each of network slices corresponding to different algorithm types, a segment identifier corresponding to a respective algorithm type, and flooding the segment identifier through an IGP; configuring, for each network slice, a QoS policy corresponding to a respective algorithm type; and, forwarding a packet based on the segment identifier and the QoS policy. In accordance with the schemes provided in the embodiments of the disclosure, by allocating, to each of network slices corresponding to different algorithm types, a segment identifier corresponding to a respective algorithm type, and flooding the segment identifier through an IGP, each node in the current IGP protocol domain may store the segment identifiers of all nodes in the current IGP protocol domain corresponding to respective algorithm types. In addition, by configuring, for each network slice, a QoS policy corresponding to the respective algorithm type, different network slices can correspond to different QoS policies. Thus, when the packets of different network slices are forwarded in the current IGP protocol domain according to the segment identifiers, the traffics among different network slices can be distinguished and isolated according to different algorithm types, and differentiated QoS policies can also be implemented for different network slices according to the corresponding QoS policies. Since the packets of network slices are forwarded based on the segment identifiers corresponding to the respective algorithm types and different network slices are configured with the QoS policies corresponding to the respective algorithm types, respectively, even if different network slices share the same link, the traffics among different network slices can be distinguished and isolated, and differentiated QoS policies can be implemented for different network slices.

It should be understood by a person having ordinary skill in the art that all or some of the steps in the methods disclosed above and the systems disclosed above may be implemented as software, firmware, hardware and suitable combinations thereof. Some or all of the physical components may be implemented as software executed by a processor such as a Central Processing Unit, a digital signal processor or a microprocessor, or implemented as hardware, or implemented as integrated circuits such as application-specific integrated circuits. Such software may be distributed on a computer-readable medium, and the computer-readable medium may include computer storage mediums (or non-temporary mediums) and communication mediums (or temporary mediums). As well-known to a person having ordinary skill in the art, the term computer storage medium includes volatile or non-volatile and removable or non-removable mediums implemented in any method or technology used to store information (such as computer-readable instructions, data structures, program modules or other data). The computer storage medium may include, but not limited to, RAMs, ROMs, EEPROMs, flash memories and other memory technologies, CD-ROMs, digital versatile disks (DVDs) or other optical disk storages, magnetic cassettes, magnetic tapes, magnetic disk storages or other magnetic storage devices, or any other mediums that can be used to store desired information and can be accessed by computers. In addition, as well-known to a person having ordinary skill in the art, the communication medium generally contains computer-readable instructions, data structures, program modules or other data in modulation data signals such as carriers or other transmission mechanisms, and may include any information transfer medium.

Although some implementations of the disclosure have been described above, the disclosure is not limited thereto. Those having ordinary skill in the art can make various equivalent variations or replacements without departing from the scope of the disclosure, and these equivalent variations or replacements shall fall into the scope defined by the appended claims of the disclosure.

The invention claimed is:

1. A routing method, comprising:
   allocating, to each of network slices corresponding to different interior gateway protocol (IGP) flex algorithm types, a segment identifier corresponding to a respective algorithm type of the IGP flex algorithm types, and flooding the segment identifier through an IGP, wherein the segment identifier comprises a node segment identifier corresponding to a node and a link segment identifier corresponding to a link, and both the node segment identifier and the link segment identifier correspond to the respective algorithm type;
   configuring, for each network slice, a quality of service (QoS) policy corresponding to the respective algorithm type;

establishing a shortest path tree to a destination node according to different network slices;

establishing, according to the shortest path tree and a different node segment identifier corresponding to the respective network slice, a forwarding entry containing the respective algorithm type to the destination node; and forwarding a packet based on the forwarding entry and the QoS policy.

2. The routing method of claim 1, wherein:

in response to the IGP being an Intermediate System to Intermediate System (ISIS) protocol, an ISIS message with a segment identifier substructure corresponding to the algorithm type is flooded to flood the segment identifier, a field representing the algorithm type being set in the segment identifier substructure;

in response to the IGP being an Open Shortest Path First (OSPF) protocol, an OSPF message with a segment identifier substructure corresponding to the algorithm type is flooded to flood the segment identifier, a field representing the algorithm type being set in the segment identifier substructure; or in response to the IGP being an Open Shortest Path First Version 3 (OSPFv3) protocol, an OSPFv3 message with a segment identifier substructure corresponding to the algorithm type is flooded to flood the segment identifier, a field representing the algorithm type being set in the segment identifier substructure.

3. The routing method of claim 1, wherein the configuring, for each network slice, a QoS policy corresponding to a respective algorithm type comprises:

configuring different QoS policies according to the different algorithm types, respectively, and applying the QoS policies to a link in the network slice corresponding to the respective algorithm type.

4. The routing method of claim 1, wherein the forwarding entry comprises a first label forwarding entry or a routing forwarding entry, and the forwarding a packet based on the forwarding entry and the QoS policy comprises:

establishing, according to different link segment identifiers, a second label forwarding entry related to the link in the corresponding network slice and containing the respective algorithm type; and, forwarding a packet according to the first label forwarding entry, the second label forwarding entry and the QoS policy; or establishing, according to different link segment identifiers, a local segment identifier forwarding entry related to the link in the corresponding network slice and containing the respective algorithm type; and, forwarding a packet according to the routing forwarding entry, the local segment identifier forwarding entry and the QoS policy.

5. The routing method of claim 4, wherein the establishing, according to the shortest path tree and a different node segment identifier corresponding to the respective network slice, a forwarding entry containing the respective algorithm type to the destination node comprises:

establishing, according to the shortest path tree and the different node segment identifier corresponding to the respective network slice, the first label forwarding entry containing the respective algorithm type to the destination node, the first label forwarding entry comprising a Forwarding Equivalence Class to Next Hop Label Forwarding Entry Map (FTN) forwarding entry and an Incoming Label Map (ILM) forwarding entry, both the FTN forwarding entry and the ILM forwarding entry containing the respective algorithm type.

6. The routing method of claim 4, wherein the establishing, according to the shortest path tree and a different node segment identifier corresponding to the respective network slice, a forwarding entry containing the respective algorithm type to the destination node comprises:

establishing, according to the shortest path tree and the different node segment identifier corresponding to the respective network slice, the routing forwarding entry containing the respective algorithm type to the destination node.

7. The routing method of claim 1, wherein the forwarding a packet based on the forwarding entry and the QoS policy comprises:

establishing a segment identifier list for each network slice according to the segment identifier, the segment identifier list containing the node segment identifier and the link segment identifier; and forwarding a packet based on the segment identifier list, the forwarding entry and the QoS policy.

8. A routing device, comprising:

a memory, a processor and computer programs stored on the memory and executable by the processor, wherein the computer programs, when executed by the processor, cause the processor to perform the routing method of claim 1.

9. A non-transitory computer-readable storage medium storing computer-executable instructions which, when executed by a processor, cause the processor to perform the routing method of claim 1.

10. A routing method, comprising:

receiving different segment identifiers flooded through an interior gateway protocol (IGP), wherein the different segment identifiers corresponding to different IGP flex algorithm types and different network slices, respectively, and different network slices corresponding to different IGP flex algorithm types, wherein each of the segment identifiers comprises a node segment identifier corresponding to a node and a link segment identifier corresponding to a link, and both the node segment identifier and the link segment identifier correspond to a respective algorithm type of the IGP flex algorithm types; and receiving packets forwarded based on different segment identifiers and different quality of service (QoS) policies, each of the packets being forwarded based on the respective QoS policy and a forwarding entry containing the respective algorithm type to the destination node, the forwarding entry being established according to a shortest path tree to the destination node and a different node segment identifier corresponding to the respective network slice, the shortest path tree being established according to the different network slices, different QoS policies being configured for different network slices, and different QoS policies corresponding to different IGP flex algorithm types.

11. The routing method of claim 10, wherein:

in response to the IGP being an Intermediate System to Intermediate System (ISIS) protocol, an ISIS message with a segment identifier substructure corresponding to the algorithm type is received to receive the segment identifier, a field representing the algorithm type being set in the segment identifier substructure;

in response to the IGP being an Open Shortest Path First (OSPF) protocol, an OSPF message with a segment identifier substructure corresponding to the algorithm type is received to receive the segment identifier, a field representing the algorithm type being set in the segment identifier substructure; or in response to the IGP being an Open Shortest Path First Version 3 (OSPFv3) protocol, an OSPFv3 message with a segment identifier substructure corresponding to the algorithm type is received to receive the segment identifier, a field representing the algorithm type being set in the segment identifier substructure.

12. A routing device, comprising:
a memory, a processor and computer programs stored on the memory and executable by the processor,
wherein the computer programs, when executed by the processor, cause the processor to perform the routing method of claim 10.

13. A non-transitory computer-readable storage medium storing computer-executable instructions which, when executed by a processor, cause the processor to perform the routing method of claim 10.

* * * * *